Feb. 9, 1971   R. SHAFFER   3,561,850
OPTICAL EFFECT GENERATOR WITH TELEVISION DISPLAY SCREEN
Filed June 20, 1968
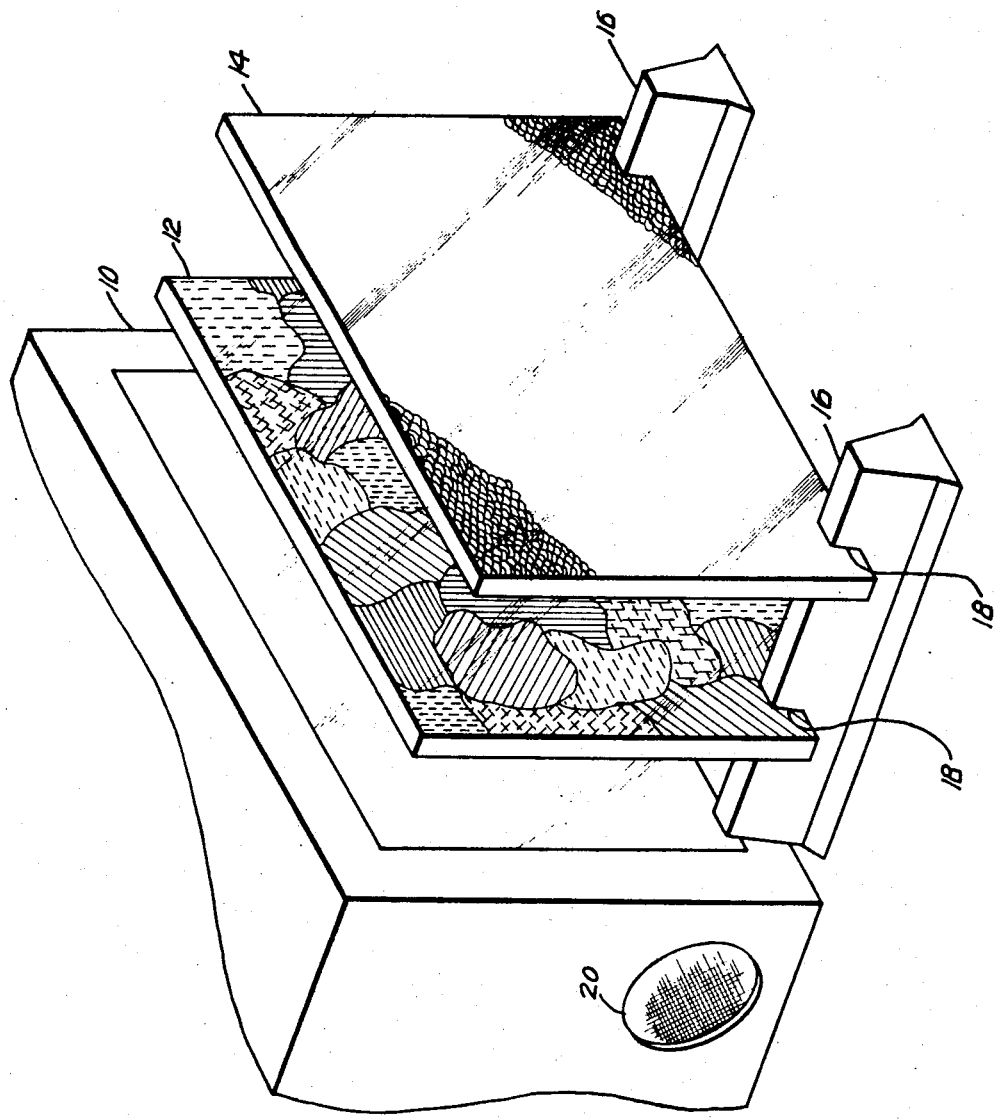
INVENTOR.
ROBERT SHAFFER
BY
Christie, Parker & Hale
ATTORNEYS

United States Patent Office 3,561,850
Patented Feb. 9, 1971

3,561,850
OPTICAL EFFECT GENERATOR WITH TELEVISION DISPLAY SCREEN
Robert Shaffer, 10238 56th St.,
Mira Loma, Calif. 91752
Filed June 20, 1968, Ser. No. 738,613
Int. Cl. G02b 5/22
U.S. Cl. 350—317                                    3 Claims

ABSTRACT OF THE DISCLOSURE

An optical effect generator utilizing a plurality of light sources, a patterned light transmitting medium and a light diffusing or refracting medium. The elements of the apparatus are arranged such that the light medium and the light transmitting medium are interposed between the viewer and the light sources with the diffusing medium being located between the viewer and the slide.

BACKGROUND OF THE INVENTION

This invention relates to an optical effects generator and in particular to a random, multicolor, light display generator especially suitable for use in conjunction with sound. The apparatus is capable of presenting "light shows" and is particularly effective when presented in a darkened enclosure together with musical accompaniment.

A phenomenon of today's culture is the interest in extraordinary effects that can be achieved by the imaginative use of lantern slides, slide projectors and other optical generators. In many instances, places of entertainment providing an appropriate enclosure and suitable music accompaniment to present "light shows" as the primary attraction, have become increasingly popular. In most instances the effect is produced by a plurality of light projectors which are adapted to direct their light through abstract or surrealistic transparencies which are successively moved into and out of the projectors' beams. Startling and unusual effects are obtained especially when the succession of projections is changed according to a predetermined tempo or in synchronism with musical accompaniment. To further enhance the effect the images are sometimes projected on moving objects such as a revolving reflector, a vibrating surface or a dancer's body.

For the most part, however, projections are obtained by providing a constant intensity light source which has a static scene interposed in the path of the light beam if only for a brief instant to cause the images on the transparency to be projected onto a receiving surface.

SUMMARY OF THE INVENTION

The present invention provides an apparatus for generating optical effects and provides in combination a plurality of light sources disposed across a geometric plane, a light transmitting medium having a contrasting pattern of images located on one side thereof and disposed before the light source and in approximately parallel relationship therewith and a light diffusing medium located on the side of the light transmitting medium opposite the plurality of light sources. The light diffusing medium is translucent to light generated by the sources and passed through the transmitting medium whereby upon energization of the various light sources a diffused display of the patterns disposed on the light transmitting medium which are associated with the particular energized source is presented to a viewer located in front of the generator.

In one aspect the present invention provides an apparatus for obtaining effects in private dwellings and enclosures which are similar to professional light shows. By providing a multipoint light source as, for example, the many point sources of light of a television receiver screen with a multicolored slide of approximately the same dimensions interposed in front of the light sources and a medium of light diffusing capability such as a shower glass disposed before the colored slide, a viewer positioned in front of the shower glass is presented with an extremely colorful and thoroughly unusual visual display. The display of the present invention is significantly enhanced when it is presented in a completely darkened enclosure and is provided with a source of musical accompaniment.

Where the light pattern generated by the light sources is synchronized in some manner with the musical accompaniment, the effect is further enhanced. Pattern synchronism of the light pattern with the musical accompaniment is accomplished in a number of ways, for example, utilizing the apparatus of the present invention with the television broadcast of a symphony concert or a ballet. In both instances whether the image projected on the TV screen is the conductor, a musician, the orchestra, a dancer, or a dancing corps, the light pattern generated on the screen changes in a discernible manner in relation to the music accompanying the display and produces an engrossing abstraction of contrasting pattern and colors when transmitted through a colored slide and displayed on the screen of the light diffuser.

The present invention provides a significant improvement over conventional light show presentations in that, in contrast to such conventional presentations, especially in a preferred embodiment, the source of light is itself comprised of a plurality of light generating sources which are scattered over a geometric plane and thus the intensity of the overall pattern of light from the source varies as does the contrasting light and dark patterns produced on the diffusing screen in accordance with the movement of the objects being picked up by the television camera. Other complementing effects are also possible with the present invention by providing several such optical effect generators disposed side by side or fanned out across the front of a viewing enclosure. The visual effect from generator to generator can be further varied by utilizing a selection of slides, and/or a selection of program materials, e.g. by a different slide being interposed between the light source and the diffusing medium of each of the generators.

DESCRIPTION OF THE DRAWING

These and other advantages of the present invention will be better understood by reference to the figure wherein an embodiment of the apparatus of the invention is depicted.

DESCRIPTION OF THE PREFERRED EMBODIMENT

Referring now to the figure of the drawing there is shown therein a preferred embodiment of the invention. In this embodiment a television screen 10 has disposed in front of it a light transmitting medium 12 and a light diffusing medium 14. Both the diffusing medium and the transmitting medium are conveniently supported along one edge by a pair of pedestals 16 having grooves 18 in which said media are adapted to fit.

In providing the source of light for illuminating the light transmitting and diffusing media it has been found that a black and white television receiver is most suitable. This is due to the fact that regardless of the program material being received, a moving pattern of light and dark areas across the face of the screen is obtained. When viewed through the media of the invention the movement of light and dark patterns has an abstract aspect to it. A speaker 20 from which emanates musical accompaniment for the light display on diffusing medium 14 is provided in the television receiver.

In addition to using a television receiver, other sources of light may also be utilized without significantly affecting the quality of the presentation. To this end a source having a plurality of individually operable lights disposed over a geometric plane, each light having sufficient intensity to produce visible illumination on the side of the light diffusing media 14 opposite the light source is suitable. By energizing each of the plurality of light sources, either randomly or according to a coherent pattern, a moving pattern of light and dark areas is observed on the viewing side of medium 14.

Light transmitting medium 12 is conveniently a glass slide having a predetermined pattern of colors of the visible spectrum disposed on one side thereof. The most satisfactory effects have been found to be obtained when the pattern reproduced on the slide tends away from an ordered pattern toward one that is more random or abstract. Unusual colorful effects can be obtained by utilizing works of art from the impressionistic and abstractionist schools of art. Startling and attention attracting effects are achieved when the pattern reproduced on the slide is one of the graphic meditation symbols of the Hindu or Buddhist religious cultures referred to as Mandalas. Alternately illuminating and extinguishing light sources located opposite the light transmitting medium has the effect of creating a moving pattern shifting from right to left and top to bottom and vice versa of the slide. When properly diffused by medium 14 this produces a strikingly eye attracting effect. In operation it has been found that most satisfactory results are obtained by locating the transmitting medium 12 closely adjacent the light source to prevent the effect of a border of black and white light being seen around the perimeter of the slide.

Disposed on the side of slide 12 opposite the light source is the light diffusing medium 14. The object of the diffusing medium is to obtain a refracting or suffusing of the colors being transmited through slide 12 to further enhance the eye appeal of the presentation being transmitted therethrough. In this application translucent glass has been found satisfactory. In a preferred embodiment, glass, sometimes referred to as "shower" glass, having beads or crystals with angular faces spread across one entire surface has been found most satisfactory. These beads or crystals have the effect of refracting light and creating a sparkling effect.

While the apparatus of the present invention is capable of creating an eye attracting effect in any environment including being utilized in ambient light, it has been found that the effect can be enhanced by several orders of magnitude by locating the apparatus in a darkened enclosure and providing sounds such as music to accompany the visual display. Where the visual display is related to or synchronized with the sound presentation, a totally absorbing effect is achieved having an entertainment quality which lasts for significant periods of time depending upon the receptiveness of the viewer.

The present invention has been described in terms of a preferred embodiment. It will be seen by those skilled in the art that there are several possible variations in the particular form of light source, light transmitting and light diffusing medium utilized in the present context and it is contemplated that such variations can be adopted without departing from the scope of the claims attached.

What is claimed is:
1. An optical effect generator comprising:
   a plurality of randomly energizable light sources disposed across a geometric plane;
   a light transmitting medium having a contrasting pattern of images utilizing a plurality of colors of the visible spectrum disposed on one side thereof, the light transmitting medium being positioned between the light source and a viewing location; and
   a light diffusing medium located on the side of the light transmitting medium opposite the plurality of light sources, the light diffusing medium being translucent to light generated by the sources and passed through the transmitting medium, the light diffusing medium being treated so as to produce refraction of the light passing therethrough, whereby upon energization of the sources a diffused display of the pattern disposed on the light transmitting medium and associated with each particular energized source is presented to the viewing location.

2. An optical effect generator according to claim 1 wherein the plurality of light sources are provided by a television display screen.

3. An optical effect generator of claim 1 including a source of musical accompaniment for the visual display.

References Cited

UNITED STATES PATENTS

| | | | |
|---|---|---|---|
| 1,891,216 | 12/1932 | Hough | 353—1X |
| 2,378,252 | 6/1945 | Staehle et al. | 350—126 |
| 2,846,498 | 8/1958 | Toulon | 178—7.86X |
| 3,119,565 | 1/1964 | Nottingham | 272—10X |
| 3,166,973 | 1/1965 | Healey | 350—317X |

FOREIGN PATENTS

| | | | |
|---|---|---|---|
| 399,951 | 9/1933 | Great Britain | 353—1 |

DAVID SCHONBERG, Primary Examiner

T. H. KUSMER, Assistant Examiner

U.S. Cl. X.R.

178—7.86; 272—10; 350—126; 353—84, 121